United States Patent
Jung et al.

(10) Patent No.: US 8,228,872 B2
(45) Date of Patent: Jul. 24, 2012

(54) METHOD FOR PERFORMING ZONE SWITCHING IN BROADBAND WIRELESS ACCESS SYSTEM

(75) Inventors: In Uk Jung, Anyang-si (KR); Yong Ho Kim, Anyang-si (KR); Ki Seon Ryu, Anyang-si (KR); Jeong Ki Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 386 days.

(21) Appl. No.: 12/683,948

(22) Filed: Jan. 7, 2010

(65) Prior Publication Data

US 2010/0172325 A1 Jul. 8, 2010

Related U.S. Application Data

(60) Provisional application No. 61/142,903, filed on Jan. 7, 2009, provisional application No. 61/148,400, filed on Jan. 30, 2009, provisional application No. 61/162,242, filed on Mar. 20, 2009.

(30) Foreign Application Priority Data

Jul. 27, 2009 (KR) .................. 10-2009-0068348

(51) Int. Cl.
*H04L 12/56* (2006.01)
*H04W 36/00* (2009.01)
*H04W 12/04* (2009.01)

(52) U.S. Cl. ........ 370/331; 370/254; 370/386; 370/422; 455/436; 455/450; 455/522.1

(58) Field of Classification Search .......... 370/252–422; 455/62–552.2; 715/734; 709/213–238; 380/270–272
See application file for complete search history.

(56) References Cited

U.S. PATENT DOCUMENTS

| | | | |
|---|---|---|---|
| 2005/0192011 A1 | 9/2005 | Hong et al. | |
| 2006/0182041 A1* | 8/2006 | Graves | 370/254 |
| 2008/0159229 A1 | 7/2008 | Kim | |
| 2010/0098025 A1* | 4/2010 | Chen et al. | 370/331 |

FOREIGN PATENT DOCUMENTS

| | | |
|---|---|---|
| KR | 1020080108209 A | 12/2008 |
| WO | WO 02/093955 A1 | 11/2002 |
| WO | WO 2006/019268 A1 | 2/2006 |
| WO | WO 2006/107701 A2 | 10/2006 |
| WO | WO 2007/078043 A2 | 7/2007 |

* cited by examiner

*Primary Examiner* — Afsar M. Qureshi
(74) *Attorney, Agent, or Firm* — Birch, Stewart, Kolasch & Birch, LLP

(57) ABSTRACT

A device, system and method for performing zone switch based handover in a legacy serving base station by an advanced mobile station (AMS), the method including receiving a ranging response (RNG-RSP) message including a zone switching TLV parameter necessary to perform zone switching to an advanced mobile station support zone (MZone) from a legacy zone (LZone) of a target advanced base station (ABS), and requesting a bandwidth for transmitting an advanced air interface ranging request (AAI_RNG-REQ) message to the MZone using the zone switching TLV parameter.

23 Claims, 9 Drawing Sheets

METHOD FOR PERFORMING ZONE SWITCHING IN BROADBAND WIRELESS ACCESS SYSTEM

This application claims the benefit of Korean Patent Application No. 10-2009-0068348, filed on Jul. 27, 2009, which is hereby incorporated by reference as if fully set forth herein.

This application claims the benefit of the U.S. Provisional Application Nos. 61/142,903, 61/148,400 and 61/162,242 filed on Jan. 7, 2009, Jan. 30, 2009 and Mar. 20, 2009, respectively, which are hereby incorporated by reference as if fully set forth herein.

BACKGROUND OF THE INVENTION

1. Field of the Invention

The present invention relates to a wireless access method, device and system, and more particularly, to a method for performing zone switch based handover.

2. Discussion of the Background Art

Handover refers to movement of a mobile station (MS) from a wireless interface of one base station (BS) to a wireless interface of another BS. Hereinafter, a handover procedure in a general IEEE 802.16e system will be described.

A serving BS in an IEEE 802.16e network may broadcast information about neighbor BSs through a mobile neighbor advertisement (MOB_NBR-ADV) message in order to inform an MS of information (topology) about basic network configuration.

The MOB_NBR-ADV message includes system information about a serving BS and neighbor BSs, for example, a preamble index, a frequency, a handover optimization capability, downlink channel descriptor (DCD)/uplink channel descriptor (UCD) information, etc.

The DCD/UCD information includes information of which an MS should be aware in order to exchange information through downlink and uplink. For example, the DCD/UCD information may include handover trigger information, and medium access control (MAC) version and media independent handover (MIH) capability information of a BS.

A general MOB_NBR-ADV message includes information about neighbor BSs of an IEEE 802.16e type only. Accordingly, information about neighbor BSs having a type other than the IEEE 802.16e type may be broadcast to MSs through a service identity information advertisement (SII-ADV) message. As a result, an MS may acquire information about BSs of a heterogeneous network by requesting a serving BS to transmit the SII-ADV message.

A procedure for an MS having information about neighbor BSs obtained through the above-described method to perform handover in an IEEE 802.16e network will be described in more detail.

A handover procedure in a general IEEE 802.16e network may be classified into three processes: handover initiation and preparation, handover execution, and handover completion.

An example of a basic handover procedure which may be constructed as described above will now be described with reference to FIG. 1.

FIG. 1 illustrates an example of a handover procedure which can be performed in an IEEE 802.16e system.

Referring to FIG. 1, an MS exchanges data with a serving BS (SBS) (step S101).

The SBS periodically broadcasts information about neighbor BSs to the MS through a MOB_NBR-ADV message (step S102).

The MS may start scanning for candidate handover BSs using a handover (HO) trigger condition while communicating with the SBS. The MS requests the SBS to perform a handover procedure by transmitting a handover request (MOB_MSHO-REQ) message when a handover condition is satisfied, for example, when a predetermined hysteresis margin value is exceeded (step S103).

The SBS informs candidate handover BSs included in the MOB_MSHO-REQ message that the MS has requested handover through a handover request (HO-REQ) message (step S104).

The candidate handover BSs take action for the MS having requested handover to transmit information about handover to the SBS through a handover response (HO-RSP) message (step S105).

The SBS transmits the information about handover, obtained through the HO-RSP message from the candidate handover BSs, to the MS through a handover response (MOB_BSHO-RSP) message. The MOB_BSHO-RSP message may include information necessary to perform handover, that is, a handover action time, a handover identifier (ID), and a dedicated handover code division multiple access (CDMA) ranging code (step S106).

The MS determines one target BS (TBS) among the candidate BSs based on the information included in the MOB-BSHO-RSP message received from the SBS. The MS then transmits a CDMA code to the determined TBS to attempt ranging (step S107).

The TBS receiving the CDMA code may inform the MS of success or failure of ranging and physical correction values through a ranging response (RNG-RSP) message (step S108).

The MS transmits a ranging request (RNG-REQ) message for authentication to the TBS (step S109).

The TBS receiving the RNG-REQ message from the MS transmits system information, which can be used in a corresponding BS, such as a connection identifier (CID) to the MS through a ranging response (RNG-RSP) message (step S110).

If the TBS successfully completes authentication of the MS and transmits all update information, the TBS informs the SBS of success or failure of handover through a handover completion (HO-CMPT) message (step S111).

Next, the MS exchanges data with the TBS which has performed handover (step S112).

It is assumed that the above-described handover process is performed between an MS and a BS conforming to the IEEE 802.16e specification (wirelessMAN-OFDMA reference system). Hereinafter, a system to which a general technique including the IEEE 802.16e specification is applied will be referred to as a 'legacy system'. An MS to which a legacy technique is applied will be referred to as a 'yardstick MS (YMS)' or a 'legacy MS', and a BS to which a legacy technique is applied will be referred to as a 'legacy BS' or 'yardstick BS (YBS)'.

Meanwhile, an MS and a BS to which a more advanced technique, including the IEEE 802.16m specification (wirelessMAN-OFDMA advanced system), than a general technique is applied will be referred to as an 'advanced MS (AMS)' and an 'advanced BS (ABS)', respectively.

It is assumed that an AMS is connected to a YBS which provides a service thereto and an ABS (wirelessMAN-OFDMA reference system/wirelessMAN-OFDMA advanced co-existing system) which supports both the AMS and the YMS is adjacent to the YBS.

It is assumed that the YBS includes only a legacy zone (LZone) having a physical channel frame structure applied to a legacy system, and the ABS includes only an AMS support zone (MZone or 16 m zone) having a physical channel frame structure applied to an advanced system when an ABS (wirelessMAN-OFDMA advanced system) supports only the AMS. It is assumed that an ABS (wirelessMAN-OFDMA reference system/wirelessMAN-OFDMA advanced co-existing system) which supports both the AMS and the YMS includes the LZone and the MZone and is divided by time division duplex (TDD) on a time basis, for example, on a frame or subframe basis in each of uplink and downlink.

It is also assumed that a service can be provided to the AMS by both the ABS and the YBS. Namely, it is assumed that a service can be provided to the AMS through any one of the MZone and the LZone and the AMS can perform a handover execution process defined both in the legacy system and in the advanced system.

Generally, in order to perform handover from a serving YBS to an ABS which supports both the AMS and the YMS, the AMS first enters an LZone of the ABS, and then continues to be served in the LZone or performs zone switching to an MZone of the ABS. Alternatively, the AMS may perform handover by immediately performing zone switching to the MZone without entering the LZone of the ABS.

SUMMARY OF THE INVENTION

For handover of an MS conforming to an advanced system when a general system (e.g., IEEE 802.16e) and an advanced system (e.g., IEEE 802.16m) co-exist, a handover method that has backward compatibility and is efficient is demanded. In other words, when an AMS performs handover from a YBS to an ABS supporting both a YMS and an AMS, the AMS needs to inform the ABS that it is an advanced terminal in order to receive a service of an advanced system specification from the ABS. Moreover, upon recognizing the handover of the AMS, the ABS should transmit system information of the ABS for an advanced system, that is, system information of an MZone to the AMS. To be served by an advanced system specification of the ABS, the AMS should attempt ranging for the MZone and needs to request a bandwidth.

An object of the present invention devised to solve the problem lies in providing a method for an AMS to efficiently perform handover in a legacy serving BS.

Another object of the present invention is to provide a method for an AMS to acquire, from an ABS, information necessary to receive a service of an advanced system specification.

A further object of the present invention is to provide a method for an AMS to perform efficient zone switch based handover within an ABS.

Technical problems to be solved in the present invention are not restricted to the above-described problems and other technical problems which are not mentioned will definitely be understood by those skilled in the art from the following description.

The object of the present invention can be achieved by providing a device, system and method for performing zone switch based handover in a legacy serving base station by an advanced mobile station (AMS). The method includes receiving a ranging response (RNG-RSP) message including a zone switching type/length/value (TLV) necessary to perform zone switching to an advanced mobile station support zone (MZone) from a legacy zone (LZone) of a target advanced base station (ABS), and requesting a bandwidth for transmitting an advanced air interface ranging request (AAI_RNG-REQ) message to the MZone using the zone switching TLV.

The method may further includes receiving an uplink grant including allocation information for a resource zone for transmitting the AAI_RNG-REQ message from the MZone, and transmitting the AAI_RNG-REQ message to the MZone through the resource zone.

The zone switching TLV may include at least one of a station identifier (STID) for identifying the AMS, a flow identifier (FID), and a zone switching action time field indicating a time point at which the zone switching is to be performed.

The request of the bandwidth may include transmitting a bandwidth request message for transmitting the AAI_RNG-REQ message to the MZone using the SID, and the transmission of the bandwidth request message may be performed at a time point indicated by the zone switching action time field.

The zone switching TLV may further include an uplink grant for transmitting the bandwidth request message, and the transmission of the bandwidth request message may be performed using an uplink resource indicated by the uplink grant for transmitting the bandwidth request message.

The request of the bandwidth may further include transmitting, to the MZone, a bandwidth request code for transmitting the bandwidth request message.

The request of the bandwidth may further include receiving an uplink grant for transmitting the bandwidth request message from the MZone, and the transmission of the bandwidth request message may be performed using an uplink resource indicated by the uplink grant for transmitting the bandwidth request message.

The transmission of the bandwidth request code may be simultaneously performed with the transmission of the bandwidth request message.

The method may further include transmitting a ranging request message including a zone switching request field to the LZone.

The zone switching request field may be a ranging purpose indicator field in which a value of bit 4 is set to '1'.

The ranging response message may be an unsolicited ranging response message according to determination of the target ABS.

The AAI_RNG-REQ message may include at least one of information requesting capability negotiation and security information.

The AAI_RNG-REQ message may include at least one of capability information and security information provided by the AMS.

The method may further include receiving an advanced air interface ranging response (AAI_RNG-RSP) message from the MZone as a response to the AAI_RNG-REQ message, and the AAI_RNG-RSP message may include at least one of capability information provided by the ABS according to capability negotiation and security parameters.

The zone switching TLV may include at least one of a zone switching action time field indicating a time point at which the zone switching to the MZone is to be performed and a zone switching ranging code indicating the zone switching.

The request of the bandwidth for transmitting the AAI_RNG-REQ message to the MZone may include transmitting the zone switching ranging code to the MZone and transmitting a bandwidth request message for transmitting the AAI_RNG-REQ message to the MZone.

The request of the bandwidth may further include receiving an uplink grant for transmitting the bandwidth request message as a response to the zone switching ranging code, and the transmission of the bandwidth request message may be performed using an uplink resource indicated by the uplink grant for transmitting the bandwidth request message.

In another aspect of the present invention, provided herein is a device, system and method for supporting zone switch based handover of an advanced mobile station (AMS) by a target advanced base station (ABS). The method include transmitting, to the AMS, a ranging response (RNG-RSP) message including a zone switching TLV necessary for the AMS to perform zone switching to an advanced mobile station support zone (MZone) through a legacy zone (LZone), receiving, from the AMS, a bandwidth request for transmitting an advanced air interface ranging request (AAI_RNG-REQ) message through the MZone, transmitting an uplink grant for transmitting the AAI_RNG-REQ message to the ABS through the MZone, and receiving the AAI_RNG-REQ message through an uplink resource indicated by the uplink grant.

The zone switching TLV may include at least one of a station identifier (SID) for identifying the AMS in the MZone, a flow identifier (FID), and a zone switching action time field indicating a time point at which the zone switching is to be performed.

In a further aspect of the present invention, provided herein is a mobile station including a processor, a reception module, a transmission module, and an antenna for transmitting an externally received radio signal to the reception module and externally transmitting a radio signal transmitted from the transmission module. The reception module performs demodulation and decoding with respect to a radio signal transmitted from the antenna, the transmission module performs modulation and coding with respect to data transmitted from the processor. If a ranging response (RNG-RSP) message including zone switching TLV necessary for zone switching to an advanced mobile station support zone (MZone) from a legacy zone (LZone) of a target advanced base station (ABS) is transmitted through the reception module, the processor controls transmission of a bandwidth request message for transmitting an advanced air interface ranging request (AAI_RNG-REQ) message to the MZone of the target ABS, and if an uplink grant for transmitting the AAI_RNG-REQ message received from the MZone is transmitted through the reception module, the processor controls transmission of the AAI_RNG-REQ message to the MZone using the uplink grant.

The zone switch TLV may include at least one of a station identifier (STID) for identifying the mobile station, a flow identifier (FID), and a zone switch action time field indicating a time point at which the zone switch is to be performed.

The processor may control transmission of the bandwidth request message to the MZone at a time point indicated by the zone switch action time field.

The zone switch TLV may further include an uplink grant for transmitting the bandwidth request message, and the processor may control transmission of the bandwidth request message using an uplink resource indicated by the uplink grant for transmitting the bandwidth request message.

The processor may control transmission of a bandwidth request code for transmitting the bandwidth request message to the MZone.

The processor may control reception of an uplink grant for transmitting the bandwidth request message received from the MZone from the reception module and transmission of the bandwidth request message using an uplink resource indicated by the uplink grant for transmitting the bandwidth request message.

The processor may control simultaneous transmission of the bandwidth request code and the bandwidth request message.

The processor may control transmission of a ranging request message including a zone switch request field to the LZone.

The zone switch request field may be a ranging purpose indicator field in which a value of bit 4 is set to '1'.

The exemplary embodiments of the present invention have the following effects.

First, an AMS can efficiently perform handover in a legacy serving BS.

Second, an AMC can efficiently acquire information necessary to be served by an advanced system specification from an ABS.

Third, an AMS can efficiently perform handover within an ABS through zone switching.

Advantageous effects obtained in the present invention are not restricted to the above-described effects and other effects which are not mentioned will definitely be understood by those skilled in the art from the following description.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE INVENTION

Figure 1:
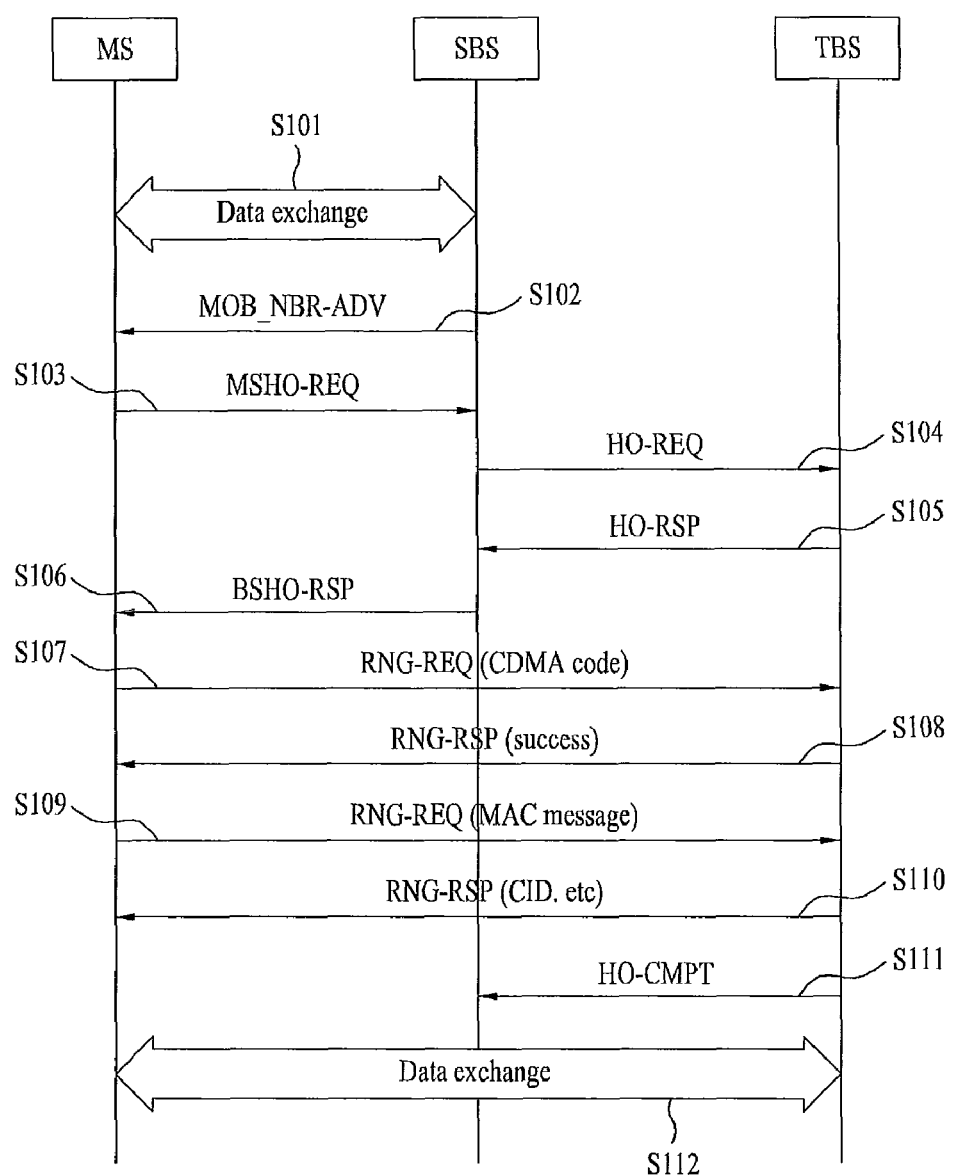
FIG. 1 illustrates an example of a handover procedure which can be performed in an IEEE 802.16e system.

To solve the above technical problems, the present invention provides a device, system and method for an AMS to efficiently perform zone switch based handover.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions or features of any one embodiment may be included in another embodiment and may be replaced with corresponding constructions or features of another embodiment.

In the exemplary embodiments of the present invention, a description is made of a data transmission and reception relationship between a base station (BS) and a mobile station (MS). Here, the BS refers to a terminal node of a network communicating directly with the MS. In some cases, a specific operation described as performed by the BS may be performed by an upper node of the BS.

Namely, in a network comprised of a plurality of network nodes including a BS, various operations performed for communication with an MS may be performed by the BS, or network nodes other than the BS. The BS may be replaced with the term 'fixed station', 'Node B', 'eNode B (eNB)', 'access point (AP)', etc. The MS may be replaced with the term 'user equipment (UE)', 'terminal', 'mobile subscriber station (MSS)', 'subscriber station (SS)', etc.

The embodiments of the present invention may be implemented by various means, for example, hardware, firmware, software, or a combination thereof.

In a hardware configuration, methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Software code may be stored in a memory unit so as to be driven by a processor. The memory unit is located at the interior or exterior of the processor and may transmit data to and receive data from the processor via various known means.

The embodiments of the present invention can be supported by standard documents disclosed in at least one of the IEEE 802 system, 3GPP system, 3GPP LTE system, and 3GPP2 system which are radio access systems. That is, steps or portions that are not described in the embodiments of the present invention for the sake of clearly describing the spirit of the present invention may be supported by the above documents. For all terms used in this disclosure, reference can be made to the above standard documents. Especially, the embodiments of the present invention may be supported by at least one of P802.16-2004, P802.16e-2005, and P802.16Rev2 which are standard documents of the IEEE 802.16 system and which are incorporated herein by reference.

The specific terms described in the following description are provided to aid the understanding of the present invention and those terms may be changed to other forms without departing from the spirit of the present invention.

In the following description, it is assumed that a legacy system is an IEEE 802.16e system and an advanced system is an IEEE 802.16m system.

A MOB_NBR-ADV message which is broadcast by a YBS of a general legacy system may include overall system information about neighbor BSs. Specifically, the system information may include information about downlink channel descriptor (DCD)/uplink channel descriptor (UCD) values which do not coincide with each other between a serving BS and the neighbor BSs. Such information may be used update the system information when an MS performs handover or enters a network. An example of DCD channel encoding will now be described with reference to Table 1.

The following Table 1 shows an example of TLV (type/length/value) encoding indicating a MAC version of a neighbor BS system in relation to the exemplary embodiments of the present invention. The TLV encoding may be included in a DCD of a MOB_NBR-ADV message broadcast by an YBS.

TABLE 1

| Type | Length | Value | Scope |
|---|---|---|---|
| 148 | 1 | Version number of IEEE 802.16 supported on this channel<br>0: IEEE 802.16m Only<br>1-7: Indicates conformance with an earlier and/or obsolete version of IEEE Std 802.16<br>8: Indicates conformance with IEEE Std 802.16-2008<br>9: Indicates conformance with IEEE Std 802.16m (Legacy Support)<br>10-255: Reserved | PMP: DCD, RNG-REQ |

In a legacy system, MAC version values 0, and 9 to 255 are reserved. In the present invention, however, a MAC value '0' may be used to indicate a MAC version of an ABS (wirelessMAN-OFDMA advanced system only or 16 m only) supporting only an AMS, and a MAC version value '9' may be used to indicate an ABS (wirelessMAN-OFDMA reference system/wirelessMAN-OFDMA advanced co-existing system) supporting both the YBS and the AMS, as shown in Table 1.

Namely, a MAC version value '0' in TLV type 148 of a DCD indicates that a corresponding ABS is a network that supports only an advanced system (IEEE 802.16m). That is, a MAC version value '0' means that the ABS includes only an advanced system dedicated frame structure (MZone) and supports features and services defined in the advanced system. Accordingly, an MS which desires to perform handover to an ABS network in which a value of TLV type 148 of the DCD is set to '0' should include dedicated AMS functions.

A MAC version value '9' indicates that a corresponding ABS supports a legacy MS. An MS which desires to perform handover to this ABS network should include YMS or AMS functions.

A rule for a MAC version value between an MS and a BS is used. That is, the MS does not attempt handover to a BS having a lower MAC version value than a MAC version value thereof (refer to IEEE standard document P802.16 Rev2/D8 11.1.3, the entire contents of which being incorporated herein by reference).

Therefore, if the modified DCD encoding shown in Table 1 is used, ABSs adjacent to a serving YBS may have a value 0 or 9 depending on whether the ABS supports a legacy YMS. Because such a MAC version value is different from values 1 to 8 which may be used by the serving YBS, the MAC version value may be included in a DCD value of a MOB_NBR-ADV message broadcast by the YBS.

If YMSs connected to the serving YBS obtain information about the ABS through the MOB_NBR-ADV message, because a MAC version value of an ABS supporting only an AMS is 0, the YMSs recognize the MAC version value of the ABS to be lower than version values thereof, that is, 1 to 8, and thus the YMSs do not attempt handover to the ABS supporting only the AMS. An ABS (wirelessMAN-OFDMA reference system/wirelessMAN-OFDMA advanced co-existing system) supporting a legacy MS (YMS) has a MAC version value of 9 which is higher than MAC version values 1 to 8 used by the YMSs. Therefore, the YMSs will attempt handover to the ABS supporting the legacy MS. Consequently, information about an ABS adjacent to the YBS can effectively be provided to the AMS considering the YMS by using the above modified MAC version value.

Figure 2:
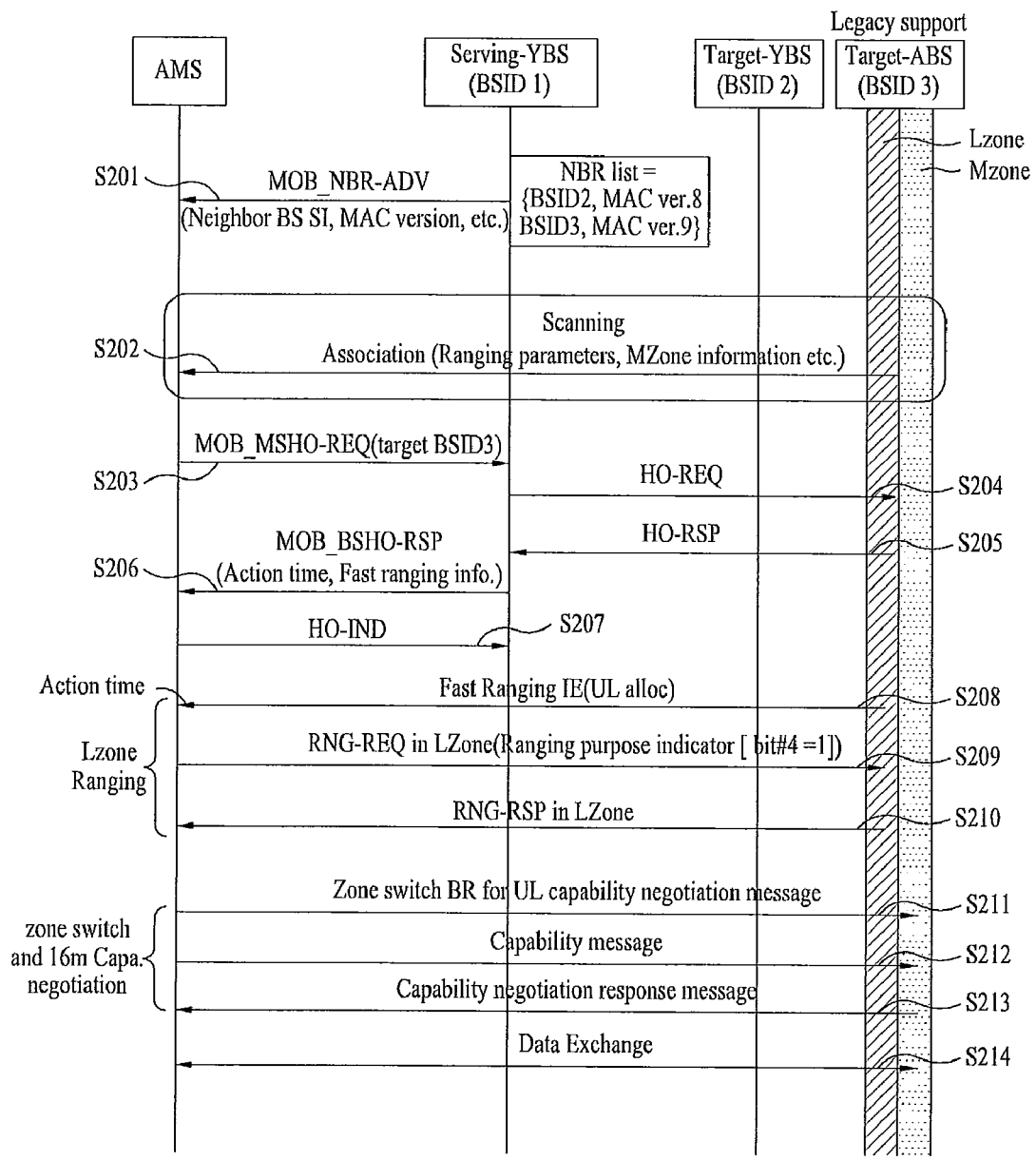
FIG. 2 illustrates an example of a general zone switch based handover process.

FIG. 2 illustrates an example of a general zone switch based handover process.

In FIG. 2, a fast ranging procedure is used. Fast ranging refers to immediate transmission of a ranging request (RNG-REQ) message through transmission of a CDMA ranging code by omitting an uplink synchronization acquisition process in order to minimize a handover delay time in an IEEE 802.16-based wireless mobile communication system.

Referring to FIG. 2, it is assumed that an AMS is served by a serving YBS (BSID 1) and another YBS (BSID 2) and an ABS (wirelessMAN-OFDMA reference system/wirelessMAN-OFDMA advanced co-existing system) (BSID 3) supporting a legacy MS are adjacent to the serving YBS. It is also assumed that a MAC version value of the serving YBS is '7' and a MAC version value of another YBS (BSID 2) is '8'. Because the ABS (BSID 3) supports both the YMS and the AMS, it is assumed that the ABS (BSID 3) has a MAC version value of '9' as shown in Table 1.

Moreover, it is assumed that the YBS has only a legacy zone (LZone) and the ABS (BSID 3) supporting the YMS has the LZone and an advanced MS support zone (MZone).

The serving YBS periodically broadcasts information about neighbor BSs through a MOB_NBR-ADV message and the AMS receives the MOB_NBR-ADV message to obtain the information about the neighbor BSs (step S201).

The MOB_NBR-ADV message broadcast by the serving YBS (BSID 1) may include DCD information of neighbor BSs having different values from the serving YBS. According to the above-described assumption, because all the candidate BSs (BSID 2 and BSID 3) have different MAC version values from a MAC version value of the serving YBS, the MAC version values of all the candidate BSs may be included in DCD TLV type 148 of the MOB_NBR-ADV message broadcast by the serving YBS.

The AMS may perform scanning for candidate BSs using a handover trigger condition while communicating with the serving YBS (step S202).

The AMS requests the serving YBS to perform a handover procedure by transmitting a handover request (MOB_MSHO-REQ) message when a handover condition is satisfied, for example, when a predetermined hysteresis margin value is exceeded. At this time, the AMS may include a preferred BS (in this case, BSID 3) in the MOB_MSHO-REQ message (step S203).

Upon receiving the MOB_MSHO-REQ message, the serving YBS informs neighbor candidate BSs that the AMS has requested handover through a handover request (HO-REQ) message (step S204).

The candidate handover BSs may take action for the AMS having requested handover to transmit information about handover to the serving YBS through a handover response (HO-RSP) message (step S205).

The serving YBS may transmit the information about handover obtained through the HO-RSP message from the candidate BSs to the AMS through a handover response (MOB_BSHO-RSP) message. Especially, the MOB_BSHO-RSP message may include an action time field indicating the time at which a fast ranging information element (IE) of the candidate BSs is transmitted to the AMS (step S206).

The AMS obtaining the time at which the fast ranging IE is transmitted through the action time field may determine handover to a target ABS (BSID 3) and transmit a handover indication (MOB_HO-IND) message to the serving YBS (step S207).

The AMS may receive the fast ranging IE from the target ABS (BSID 3) at the time indicated by the action time field and obtain uplink (UL) allocation information for transmitting a ranging request (RNG-REQ) message (step S208).

The AMS transmits the RNG-REQ message to an LZone of the ABS using an uplink resource indicated by the received uplink allocation information (step S209).

In this case, the AMS may request the ABS to perform zone switching. Zone switching refers to switching of a zone to an MZone from an LZone in order for the AMS to be serviced in the MZone of the ABS, or the opposite.

A method for the AMS to inform the target BS of a zone switch request may use a ranging purpose indication field of the ranging request message. This will be described with reference to Table 2.

The following Table 2 shows an example of the ranging purpose indication field related to the exemplary embodiments of the present invention.

TABLE 2

| Name | Type | Length | Value |
|---|---|---|---|
| Ranging Purpose Indication | 6 | 1 | Bit 0: HO indication (may be combined with other IEs. If set to '1', indicates that MS attempts network re-entry in handover or idle mode)<br>Bit 1: Location update request (if set to '1', indicates that location update procedure is performed in idle mode)<br>Bit 2: Seamless HO indication (may be combined with other IEs. If set to '1', indicates that MS initiates ranging by seamless handover procedure)<br>Bit 3: Ranging Request for emergency call setup (if set to '1', indicates emergency call setup operation of MS)<br>Bit 4: HO indication of 16m MS (AMS)<br>Bits 5-7: Reserved |

In a ranging purpose indication field used in a general legacy system, bit 4 may be used as shown in Table 2. Then the AMS may set a value of the bit 4 to '1' when transmitting the ranging request message to the ABS to request the target ABS to perform zone switch based handover. Upon receiving the ranging request message in which a value of bit 4 in the ranging purpose indication field is set to '1', the target ABS may determine without additional information that an MS which has transmitted the ranging request message is an AMS.

Meanwhile, the AMS may further include MAC version information thereof in the ranging request message in order to inform the target ABS that it is an advanced terminal.

The target ABS (BSID 3) transmits a ranging response (RNG-RSP) message to the AMS as a response to the ranging request message (step S210).

The AMS enters an LZone of the target ABS. Next, the AMS requests an MZone of the target ABS to allocate a bandwidth for transmitting the ranging request message in order to perform zone switching to the MZone of the target ABS (step S211).

Upon allocating the requested bandwidth from the ABS, the AMS transmits a capability negotiation request message to the ABS and the ABS transmits a capability negotiation response message to the AMS, thereby completing capability negotiation (steps S212 and S213).

An advanced air interface ranging request (AAI_RNG-REQ) message may be used for the capability negotiation request message, and an advanced air interface ranging response (AAI_RNG-RSP) message may be used for the capability negotiation response message.

Next, the AMS may exchange data in the MZone of the ABS (step S214).

For a bandwidth request (BR) in step S211 of the above handover process, the AMS needs to obtain a station identifier (STID) to be used in the MZone of the target ABS. This is because an STID of the ABS should be included in a BR message to be transmitted to the MZone, that is, in an STID field of a BR header, so that the ABS can transmit an UL grant to the AMS using a corresponding STID.

If the AMS has previously obtained the STID, no problems occur, but if not, a procedure for receiving the STID through CDMA code ranging for BR is additionally required. Because the AMS has already completed synchronization or authentication in the LZone of the ABS, the execution of the code ranging may lead to an unnecessary delay. Because the CDMA code ranging is based on contention, if collision occurs with a CDMA code transmitted by another AMS, an additional delay occurs.

In addition, the AMS should exchange a relatively large quantity of data for capability negotiation through the AAI_RNG-REQ/RSP message in the MZone of the ABS or for system information update. Accordingly, a general purpose AAI_RNG-REQ message and an AAI_RNG-REQ message for zone switching may have different data sizes. That is, there may be a difference between the two purposes in UL resource allocation through CDMA code ranging.

A procedure required to transmit the AAI_RNG-REQ message for zone switching rather than a general ranging purpose may have the above-described problem. Therefore, the present invention proposes an efficient zone switching method and a handover method through the zone switching method.

First Embodiment

An efficient zone switching method according to the present invention is divided into two methods. One method uses a BR procedure and the other method uses a CDMA ranging code. The zone switching method using the BR procedure previously receives, in an LZone, partial information necessary in an MZone and has the advantage of omitting unnecessary ranging for synchronization. The zone switching method using the CDMA ranging code does not need to previously receive information such as an STID and directly receive additional MZone information from a corresponding zone.

1. Zone Switching Method Through BR Procedure

According to an exemplary embodiment of the present invention, a zone switching method through a BR is provided which will be described with reference to FIGS. 3 to 7.

Prior to description of the zone switching method, parts applied commonly to FIGS. 3 to 7 will now be described.

In FIGS. 3 to 7, it is assumed that an ABS (wirelessMAN-OFDMA reference system/wirelessMAN-OFDMA advanced co-existing system) (BSID 3) supporting both a YMS and an AMS is adjacent to a serving YBS (BSID 1). It is also assumed as described previously that the YMS includes only an LZone and the ABS supporting both the AMS and the YMS includes the LZone and an MZone.

Moreover, a MOB_NBR-ADV message broadcasted by the serving YBS (BSID 1) may include DCD information of neighbor BSs having different values from the serving YBS.

Especially, a MAC version value of the ABS (BSID 3) may be included in DCD TLV type 148 of the MOB_NBR-ADV message broadcast by the serving YBS (BSID 1).

Figure 3:
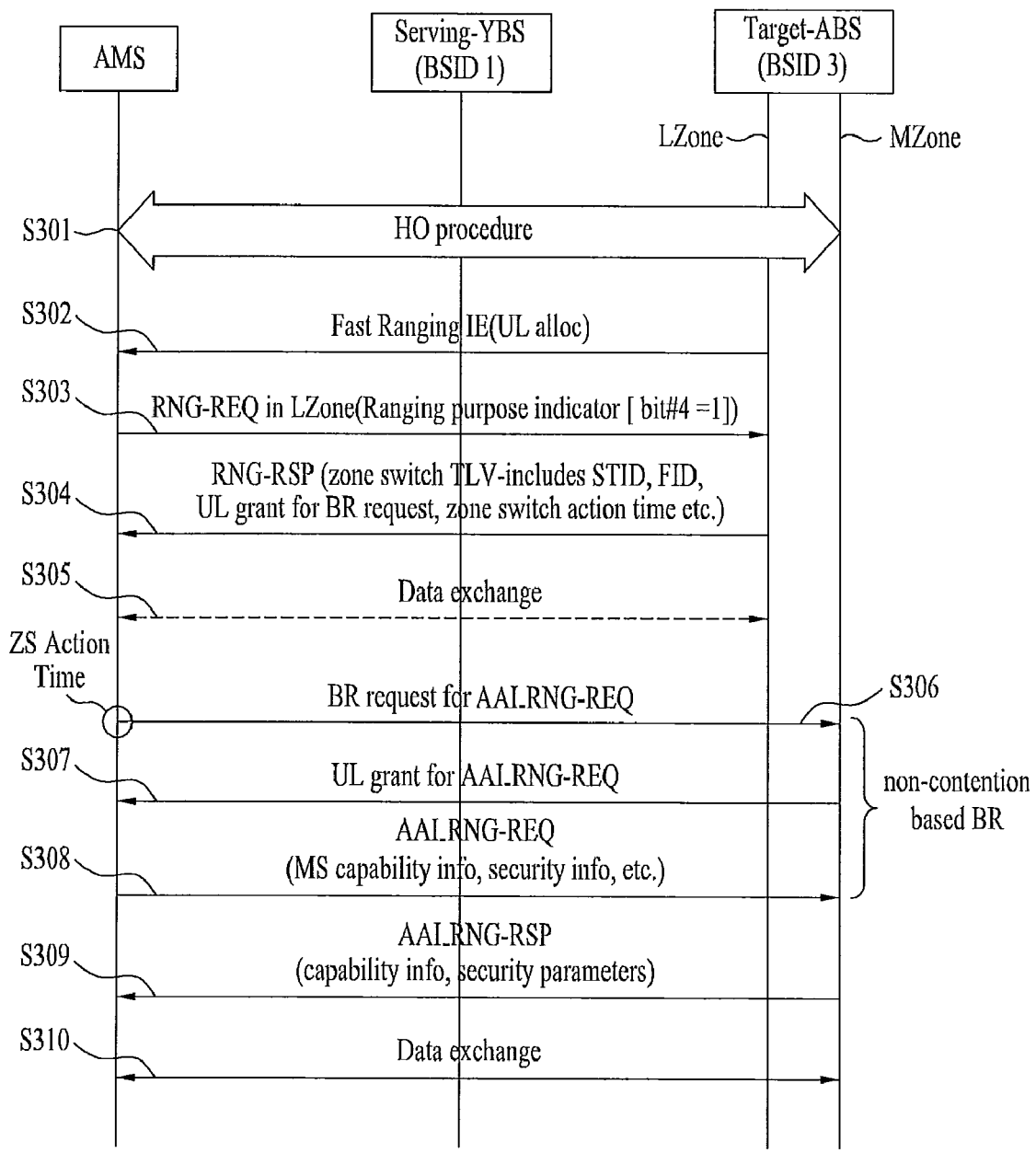
FIG. 3 illustrates an example of a method for an AMS to perform zone switching through a bandwidth request procedure according to an exemplary embodiment of the present invention.

FIG. 3 illustrates an example of a method for an AMS to perform zone switching through a BR procedure according to an exemplary embodiment of the present invention.

Referring to FIG. 3, an AMS may perform a handover procedure as a preparation step for zone switching (step S301).

The handover procedure refers to a process for an AMS to obtain neighbor BS information (e.g., MAC version information, an action time, etc.) from a serving YBS, determine whether to perform handover to a target ABS (BSID 3), and transmit handover indication (HO-IND) to a serving YBS as illustrated in steps S201 to S207 of FIG. 2.

The handover procedure may include both MS-initiated handover and serving BS-initiated handover. For simplicity of specification, a detailed description will be omitted.

The AMS may receive a fast ranging IE from a target ABS (BSID 3) at the time indicated by an action time field to acquire UL allocation information for transmitting a ranging request (RNG-REQ) message (step S302).

The AMS transmits the RNG-REQ message to an LZone of the ABS using an UL resource indicated by the UL allocation information (step S303).

The AMS may request the ABS to perform zone switching by setting a value of bit 4 of a ranging purpose indication field of the ranging request message to '1'. The ranging request message may include MAC version information of the AMS to inform the target ABS that the AMS is an advanced terminal.

Upon receiving the ranging request message, the target ABS may recognize that the AMS has requested zone switching and may transmit a ranging response (RNG-RSP) message including information (zone switch TLV or ZS TLV) necessary for zone switching to the AMS (step S304).

The zone switch TLV may include an STID used in an MZone of the ABS by the AMS, a flow identifier (FID), an UL grant for transmitting a BR message to the MZone, and a zone switch action time field indicating the time for performing zone switching to the MZone by the AMS.

Reasons for requesting the above information will now be described.

In order for the AMS to perform switch zone to an MZone of the ABS, zone specific system information, such as capability negotiation and security parameters, should be updated. Such information update may be performed through an AAI_RNG-REQ message and an AAI_RNG-RSP message while the AMS performs zone switching to the MZone. To transmit the AAI_RNG-REQ message, the AMC should previously receive an UL resource for transmitting the AAI_RNG-REQ message through an UL grant.

The UL grant for the AAI_RNG-REQ message may be transmitted to the AMS from the ABS according to a BR of the AMS for the AAI_RNG-REQ message. For transmission of a BR message and UL grant, an STID is needed so that the ABS can identify the AMS in the MZone. In order for the AMS to transmit the BR message for the AAI_RNG-REQ message to the ABS, an UL resource for the BR message should be previously allocated to the AMS.

Accordingly, the zone switch TLV may include the STID, and UL allocation information for transmitting the BR message to the MZone.

After receiving the ranging response message, the AMS may perform data exchange by re-entering an LZone of the ABS or immediately perform a next procedure without entering a network (step S305).

Next, the AMS may receive a superframe header (SFH) of the MZone to acquire synchronization information of the MZone and system information (not shown).

The AMS may transmit a BR message (i.e., a BR header) for transmitting the AAI_RNG-REQ message to the MZone of the ABS using the STID obtained through the ranging response message (step S306).

Here, because the UL resource for transmitting the BR message (UL grant for BR) has previously been allocated in step S304, the BR procedure is a non-contention based BR. The BR message may be transmitted at the time indicated by the zone switch action time. Namely, the UL resource for transmitting the BR message may be allocated at the time indicated by the zone switch action time.

The ABS transmits an UL grant including UL allocation information allowing the AMS to transmit the AAI_RNG-REQ message, to the AMS according to the BR of the AMS (step S307).

The AMS transmits the AAI_RNG-REQ message to the MZone of the ABS using the UL resource indicated by the UL grant received from the ABS (step S308).

The AAI_RNG-REQ message may include capability information of the AMS for capability negotiation, and security information. The capability information of the AMS may include information about multi-carrier, femto capability, relay capability, physical capability, media independent handover (MIH) capability, and EMBS.

The ABS transmits information about the capability negotiation with the MS and security parameters to the AMS through an AAI_RNG-RSP message (step S309).

In this case, the ABS may additionally inform the AMS of procedures which can be omitted during zone switching through a handover optimization flag of the AAI_RNG-RSP message.

The AMS finishes zone switching to the MZone of the ABS through the above-described procedures and may perform normal data exchange (step S310).

If the capability information or security information is not shared in a process of exchanging the AAI_RNG-REQ/RSP message in steps S308 and S309, it may be shared through exchange of an advanced air interface registration request (AAI_REG-REQ) message and an advanced air interface registration response (AAI_REG-RSP) message (not shown).

Through the above-described method, the AMS can perform zone switching by a more efficient and simple procedure.

Figure 4:
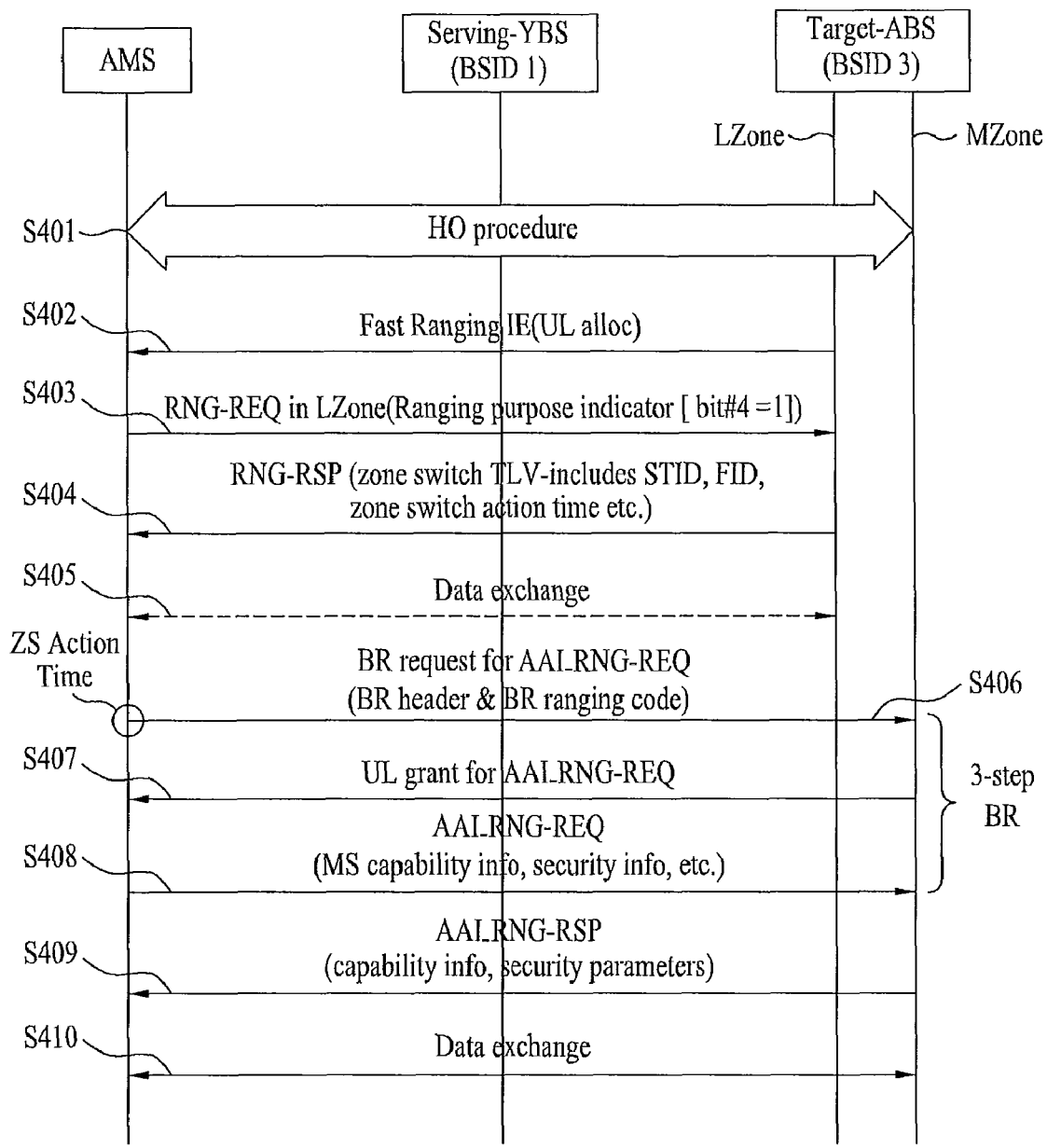
FIG. 4 illustrates an example of a method for an AMS to perform zone switching through a contention based bandwidth request procedure according to an exemplary embodiment of the present invention.

FIG. 4 illustrates an example of a method for an AMS to perform zone switching through a contention based BR procedure according to an exemplary embodiment of the present invention.

In FIG. 4, steps S401 to S403 are similar to steps S301 to S303 of FIG. 3 and therefore repetitive description will be omitted.

After step S403, upon receiving a ranging request (RNG-REQ) message, a target ABS (BSID 3) may recognize that an AMS has requested zone switching and may transmit a ranging response (RNG-RSP) message including a zone switch TLV to the AMS (step S404).

The zone switch TLV may include an STID used in an MZone of the ABS by the AMS, an FID, and a zone switch action time. Unlike FIG. 3, an UL grant for transmitting a BR message to the MZone (UL grant for BR) may not be included in the zone switch TLV (ZS TLV).

Upon receiving the RNG-RSP message, the AMS may perform data exchange by re-entering an LZone of the ABS or perform a next procedure without entering a network (step S405).

The AMS may transmit a BR message (i.e., a BR header) to an MZone of the ABS in order to receive an UL grant for an AAI_RNG-REQ message using the STID obtained through the RNG-RSP message (step S406).

Here, because an UL resource for transmitting the BR message (UL grant for BR) has not been allocated in step S404, the BR procedure is a contention based BR. Accordingly, the AMS may simultaneously transmit a BR ranging code and a BR message (i.e., a BR header) for the AAI_RNG-REQ message to the MZone of the ABS. As described above, a BR procedure for immediately transmitting a MAC message by omitting a process of receiving an UL grant for a BR is called a 3-step BR.

The BR message may be transmitted from the AMS at the time indicated by a zone switch action time.

Upon receiving the BR message from the AMS, the ABS transmits an UL grant for the AAI_RNG-REQ message, including UL allocation information, to the AMS when collision with a ranging code transmitted from another AMS does not occur (step S407).

Steps S408 to S410 are similar to steps S308 to S310 of FIG. 3 and therefore a repetitive description thereof will be omitted.

Figure 5:
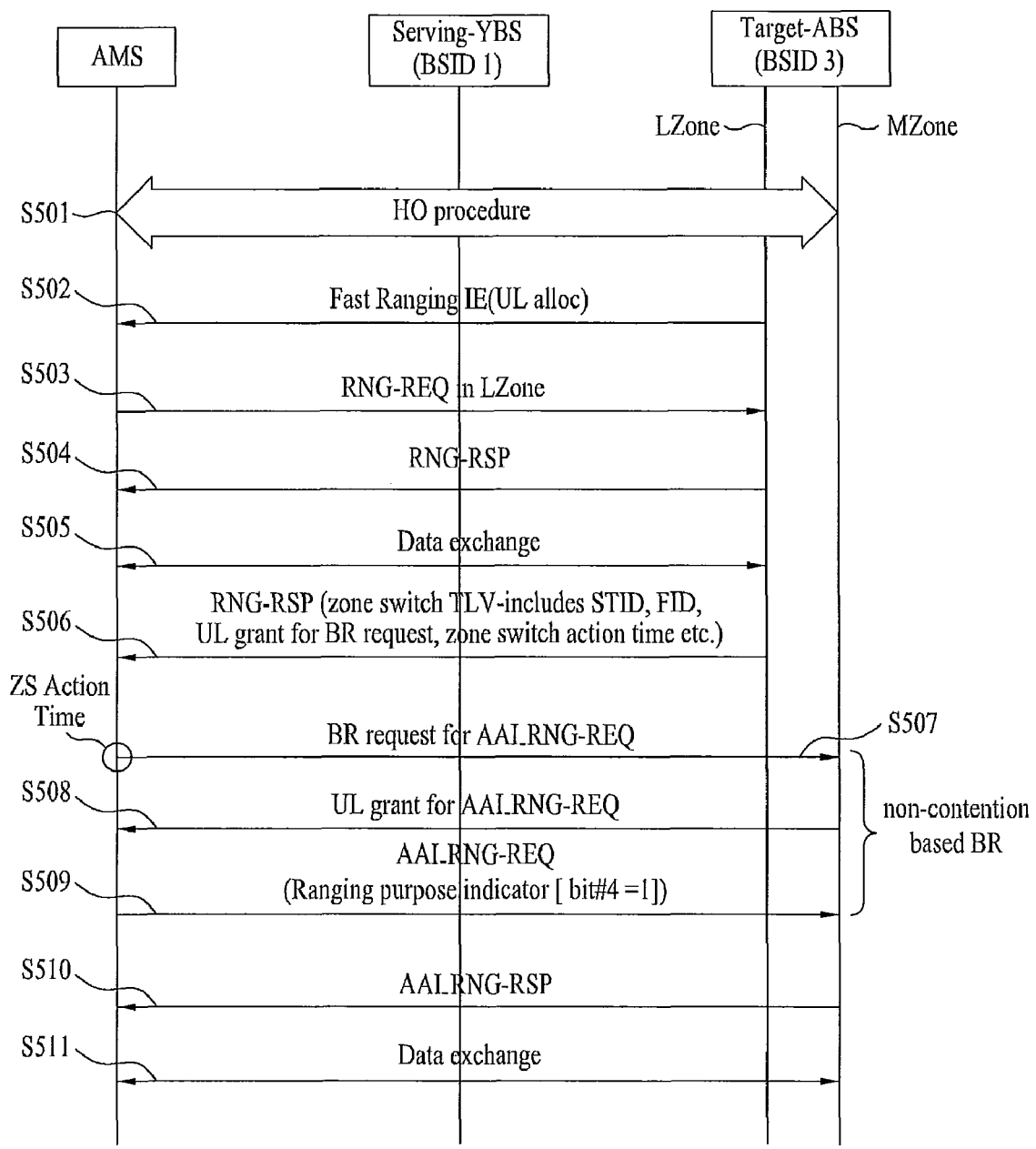
FIG. 5 illustrates an example of a method for an AMS to perform handover to an LZone and perform zone switching through a non-contention based bandwidth request procedure by a command of a target ABS according to an exemplary embodiment of the present invention.

FIG. 5 illustrates an example of a method for an AMS to perform handover to an LZone and perform zone switching through a non-contention based BR procedure by a command of a target ABS according to an exemplary embodiment of the present invention.

In FIG. 5, steps S501 and S502 are similar to steps S301 and S302 of FIG. 3 and therefore a repetitive description thereof will be omitted.

An AMS transmits a ranging request (RNG-REQ) message to an LZone of an ABS using an UL resource allocated from the ABS in step S502 (step S503).

The RNG-REQ message may include MAC version information of the AMS to inform the ABS that the AMS is an advanced terminal.

The ABS transmits a ranging response (RNG-RSP) message as a response to the RNG-REQ message to the AMS to inform the AMS of system information, which can be used in the LZone, such as a CID (step S504).

The AMS performs handover to the LZone of the ABS through the obtained information and performs data exchange with the ABS in the LZone according to a procedure determined in a legacy system (step S505).

Next, the ABS may instruct the AMS to perform zone switching to an MZone from the LZone thereof. This is because the ABS can recognize that the AMS is an advance terminal through MAC version information of the ranging request message in step S503. To this end, the ABS transmits an unsolicited RNG-RSP message to the AMS (step S506).

At this time, the RNG-RSP message may include a zone switch TLV. The zone switch TLV may include an STID for identifying the AMS in the MZone of the ABS by the AMS, an FID, an UL grant for transmitting a BR message to the MZone, and a zone switch action time.

The AMS may recognize that the ABS has instructed the AMS to switch a zone through the zone switch TLV included in the RNG-RSP message. The AMS may transmit a BR message (i.e., BR header) for transmitting an AAI_RNG-REQ message to the MZone of the ABS using the STID contained in the zone switch TLV (step S507).

In this case, because an UL resource for transmitting the BR message has previously been allocated in step S506, the BR procedure is a non-contention based BR. The BR message may be transmitted at the time indicated by the zone switch action time. Namely, the UL resource for transmitting the BR message may be allocated at the time indicated by the zone switch action time.

Because the next steps S508 to S511 are similar to steps S307 to S310 of FIG. 3, a repetitive description thereof will be omitted.

Figure 6:
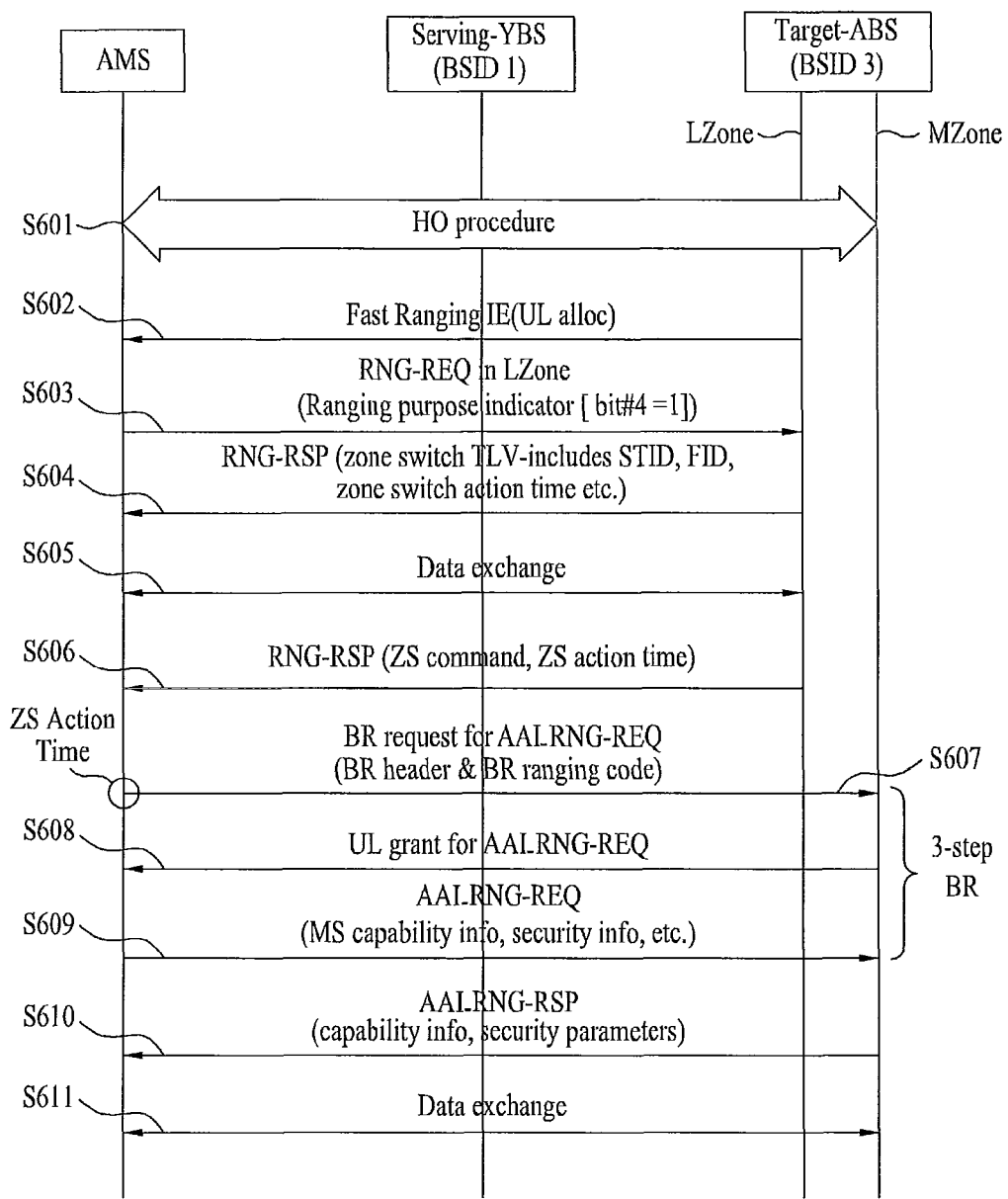
FIG. 6 illustrates an example of a method for an AMS to perform handover to an LZone and perform zone switching through a contention based bandwidth request procedure by a command of a target ABS according to an exemplary embodiment of the present invention.

FIG. 6 illustrates an example of a method for an AMS to perform handover to an LZone and perform zone switching through a contention based BR procedure by a command of a target ABS according to an exemplary embodiment of the present invention.

Because steps S601 to S604 of FIG. 6 are similar to steps S401 to S404 of FIG. 4, a repetitive description thereof will be omitted.

An AMS which has obtained a zone switch TLV through a ranging response message may desire to immediately perform zone switching to an MZone of an ABS. However, the ABS may cause the AMS to first enter an LZone according to a load state or a delay circumstance of the MZone thereof. Therefore, the AMS may perform data exchange by entering the LZone of the ABS (step S605).

Next, the ABS may instruct the AMS to perform zone switching to the MZone from the LZone thereof in consideration of the load state of the MZone. To this end, the ABS may transmit an unsolicited RNG-RSP message to the AMS (step S606).

The unsolicited RNG-RSP message may include a changed value or omitted value of a zone switch TLV included in an RNG-RSP message transmitted in step S604. For example, if the zone switch action time known to the AMS in step S604 elapses according to the entry of the AMS into the LZone, the ABS may include a new zone switch action time in a zone switch TLV of the unsolicited RNG-RSP message. Further, the ABS may include an additional field (e.g., a zone switch command field) commanding the AMS to switch zones in the unsolicited RNG-RSP message.

The AMS confirms the zone switch TLV or the zone switch command field included in the unsolicited RNG-RSP message transmitted from the ABS, thereby recognizing that the ABS has instructed zone switching.

In this case, because an UL resource for transmitting a BR message has not been allocated in step S604 or S606, the BR procedure is a contention based BR (if the UL resource for transmitting the BR message has been allocated in step S606, the BR procedure is a non-contention based BR). Accordingly, the AMS may perform a 3-step BR for simultaneously transmitting a BR ranging code and a BR message (i.e., a BR header) to the MZone of the ABS (step S607).

The BR may be performed at the time indicated by the zone switch action time allocated newly to the AMS.

Upon receiving the BR message from the AMS, the ABS transmits an UL grant for transmitting an AAI_RNG-REQ message, including UL allocation information, to the AMS when collision with a ranging code transmitted from another AMS does not occur (step S608).

Steps S609 to S611 are similar to steps S308 to S310 of FIG. 3 and therefore a repetitive description thereof will be omitted.

Figure 7:
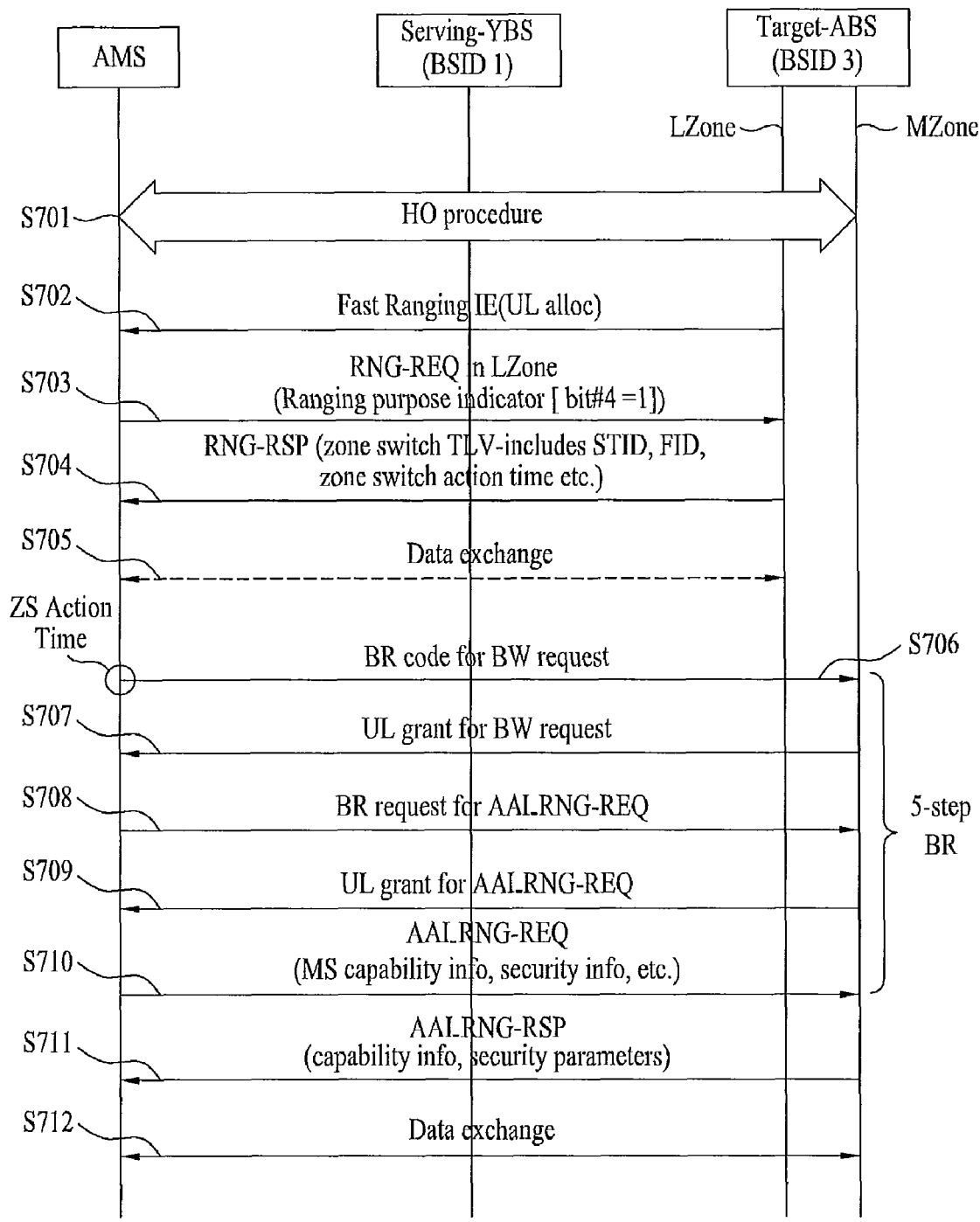
FIG. 7 illustrates another example of a method for an AMS to perform zone switching through a contention based bandwidth request procedure according to an exemplary embodiment of the present invention.

FIG. 7 illustrates another example of a method for an AMS to perform zone switching through a contention based BR procedure according to an exemplary embodiment of the present invention.

In FIG. 7, steps S701 to S705 are similar to steps S301 to S305 of FIG. 3 and therefore a repetitive description thereof will be omitted.

An AMS may perform a BR for transmitting an AAI_RNG-REQ message using an STID acquired through a ranging response message in step S704. In this case, because an UL resource for transmitting a BR message has not been allocated, the AMS should request the ABS to transmit an UL grant for transmitting the BR message (UL grant for BR) by a contention based scheme. A 5-step BR procedure may be used instead of the above-described 3-step bandwidth request.

The AMS transmits, to an MZone of the ABS, a BR code for obtaining the UL grant for transmitting the BR message to the ABS (step S706).

The BR code may be transmitted at the time indicated by a zone switch action time.

The ABS transmits the UL grant for the BR to the AMS when the BR code transmitted by the AMS does not collide with a code transmitted by another MS (step S707).

The AMS may transmit the BR message for transmitting the AAI_RNG-REQ message to the MZone of the ABS using an UL resource indicated by the UL grant received from the ABS (step S708).

In this case, an STID transmitted through a zone switch TLV may be used.

The ABS transmits an UL grant for transmitting the AAI_RNG-REQ, including UL allocation information, to the AMS according to the BR of the AMS (step S709).

The AMS transmits the AAI_RNG-REQ message to an MZone of the ABS using an UL resource indicated by the UL grant received from the ABS (step S710).

Accordingly, the 5-step BR procedure may be ended. Steps S711 and S712 are similar to steps S309 and S310 of FIG. 3, and therefore a repetitive description thereof will be omitted.

In summary, the above-described zone switching method is performed such that an AMS determines handover and sets a value of bit 4 of a ranging purpose indication field included in a ranging request message to '1'. Then, the AMS transmits the ranging request message to an LZone of a target ABS.

The ABS may transmit a zone switch TLV to the AMS. The AMS acquires information, necessary for zone switching, such as an STID and a zone switch action time, using the zone switch TLV and performs a BR for transmitting an AAI_RNG-REQ message to an MZone of the ABS. If the zone switch TLV includes an UL grant for BR, a non-contention based BR scheme is used, and otherwise, a 3-step or 5-step contention based BR scheme may be used.

The ABS may transmit the UL grant to the AMS as a response to the BR for transmitting the AAI_RNG-REQ message.

The AMS receives the UL grant from the ABS and transmits the AAI_RNG-REQ message to the MZone of the ABS using an UL resource indicated by UL allocation information included in the UL grant. Then the ABS may transmit the AAI_RNG-RSP message to the AMS. Through this process, the AMS exchanges capability negotiation and security information with the ABS. The AMS completes zone switching to the MZone of the ABS and performs data exchange.

Hereinafter, a zone switching method through CDMA code ranging will be described.

Second Embodiment

2. Zone Switching Method Using CDMA Code Set for Zone Switching

According to another exemplary embodiment of the present invention, a method for efficiently performing zone switching by additionally setting a CDMA code set for zone switching is provided. This will be described with reference to FIG. 8.

Figure 8:
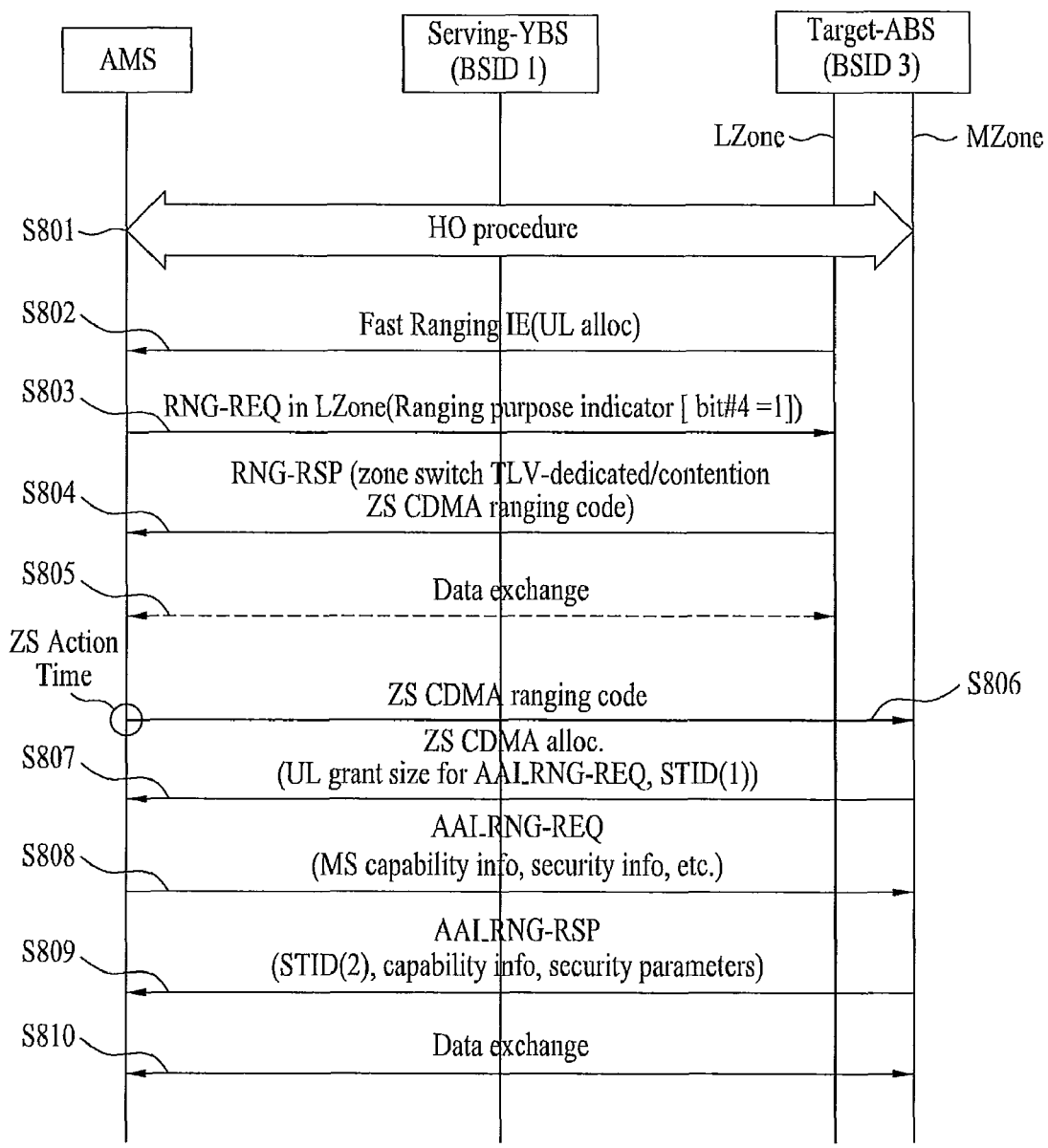
FIG. 8 illustrates an example of a method for an AMS to perform zone switching through a CDMA ranging code according to another exemplary embodiment of the present invention.

FIG. 8 illustrates an example of a method for an AMS to perform zone switching through a CDMA ranging code according to another exemplary embodiment of the present invention.

In FIG. 8, it is assumed that an ABS (wirelessMAN-OFDMA reference system/wirelessMAN-OFDMA advanced co-existing system) (BSID 3) supporting both a YMS and an AMS is present adjacently to a serving YBS (BSID 1). It is also assumed as described previously that the YBS includes only an LZone and the ABS supporting both the AMS and the YMS includes the LZone and an MZone.

Moreover, a MOB_NBR-ADV message broadcasted by the serving YBS (BSID 1) may include DCD information of neighbor BSs having different values from the serving YBS. Especially, a MAC version value of the ABS (BSID 3) may be included in DCD TLV type 148 of the MOB_NBR-ADV message broadcast by the serving YBS (BSID 1).

Steps S801 to S803 of FIG. 8 are similar to steps S301 to S303 of FIG. 3 and therefore a repetitive description thereof will be omitted.

A target ABS (BSID 3) may recognize that an AMS has requested zone switch by receiving a ranging request (RNG-REQ) message and transmits a ranging response (RNG-RSP) message including information necessary for zone switching of the AMS, that is, a zone switch TLV to the AMS (step S804).

The zone switch TLV may include a zone switch action time indicating the time for performing zone switching in an MZone by the AMS. The zone switch TLV may also include a CDMA ranging code (ZS code) to be used in the MZone by the AMS for zone switching.

The ZS code refers to a CDMA ranging code transmitted to an MZone of the ABS in order for the AMS to request UL allocation information for transmitting an AAI_RNG-REQ message to the MZone of the ABS. The ZS code may additionally be re-set by separating a part of an existing CDMA code set or may be newly defined. The ZS code may be divided into a dedicated ZS CDMA ranging code allocated exclusively to a specific AMS and a contention ZS CDMA ranging code for a contention based scheme.

After receiving the ranging response message, the AMS may perform data exchange by re-entering an LZone of the ABS or may immediately perform a next procedure without entering a network (step S805).

The AMS may transmit the ZS code obtained through the ranging response message to the MZone of the ABS to request an UL grant for transmitting the AAI_RNG-REQ message (step S806).

If a dedicated ZS CDMA ranging code is allocated in step S804, the ZS code may be transmitted by a non-contention based scheme, and otherwise, the ZS code may be transmitted by a contention-based scheme. If the ZS code is not allocated in step S804, the AMS may transmit A randomly selected ZS code from a previously defined ZS code set to the MZone of the ABS.

The ZS code may be transmitted at the time indicated by a zone switch action time field.

The ABS receiving the ZS code may allocate an UL resource corresponding to a size of the AAI_RNG-REQ message for zone switching of the AMS to the AMS through the UL grant for the AAI_RNG-REQ message or through ZS CDMA allocation (step S807).

The UL grant may include an STID which is used for identifying the AMS in the MZone of the ABS.

The AMS may transmit the AAI_RNG-REQ message to the MZone of the ABS using the UL resource indicated by the received UL grant (step S808).

The AAI_RNG-REQ message may include capability information of the AMS for capability negotiation, and security information. The capability information of the AMS may include information about multi-carrier, femto capability, relay capability, physical capability, media independent handover (MIH) capability, and EMBS.

The ABS transmits information about the capability negotiation with the MS and security parameters to the AMS through an AAI_RNG-RSP message (step S809).

In this case, the ABS may additionally inform the AMS of procedures which can be omitted during zone switching through a handover optimization flag of the AAI_RNG-RSP message.

The AMS completes zone switching to the MZone of the ABS through the above-described procedures and may perform normal data exchange with the ABS (step S810).

As described above, the methods according to the exemplary embodiments of the present invention can obtain information such as an STID of an MZone of a target ABS without an additional unnecessary procedure. Because an AMS does not repetitively perform synchronization or authentication, an unnecessary delay can be prevented. Furthermore, because an AAI_RNG-REQ message performs exchange of data of a relatively large quantity such as capability negotiation or system information update, rather than a general purpose, a resource allocation problem of an UL resource can be solved.

As still another exemplary embodiment of the present invention, an MS and a BS in which the exemplary embodiments of the present invention described with reference to FIGS. 2 to 8 can be performed will now be explained.

The MS may operate as a transmitter in UL and as a receiver in downlink (DL). The BS may operate as a receiver in UL and as a receiver in DL. Namely the MS and BS may include a transmitter and a receiver to transmit information or data.

The transmitter and receiver may include a processor, a module, a portion, and/or module to execute the embodiments of the present invention. Especially, each of the transmitter and receiver may include a module (means) for encrypting a message, a module for interpreting the encrypted message, and an antenna for transmitting and receiving a message. An example of such a transmitter and receiver will now be described with reference to FIG. 9.

Figure 9:
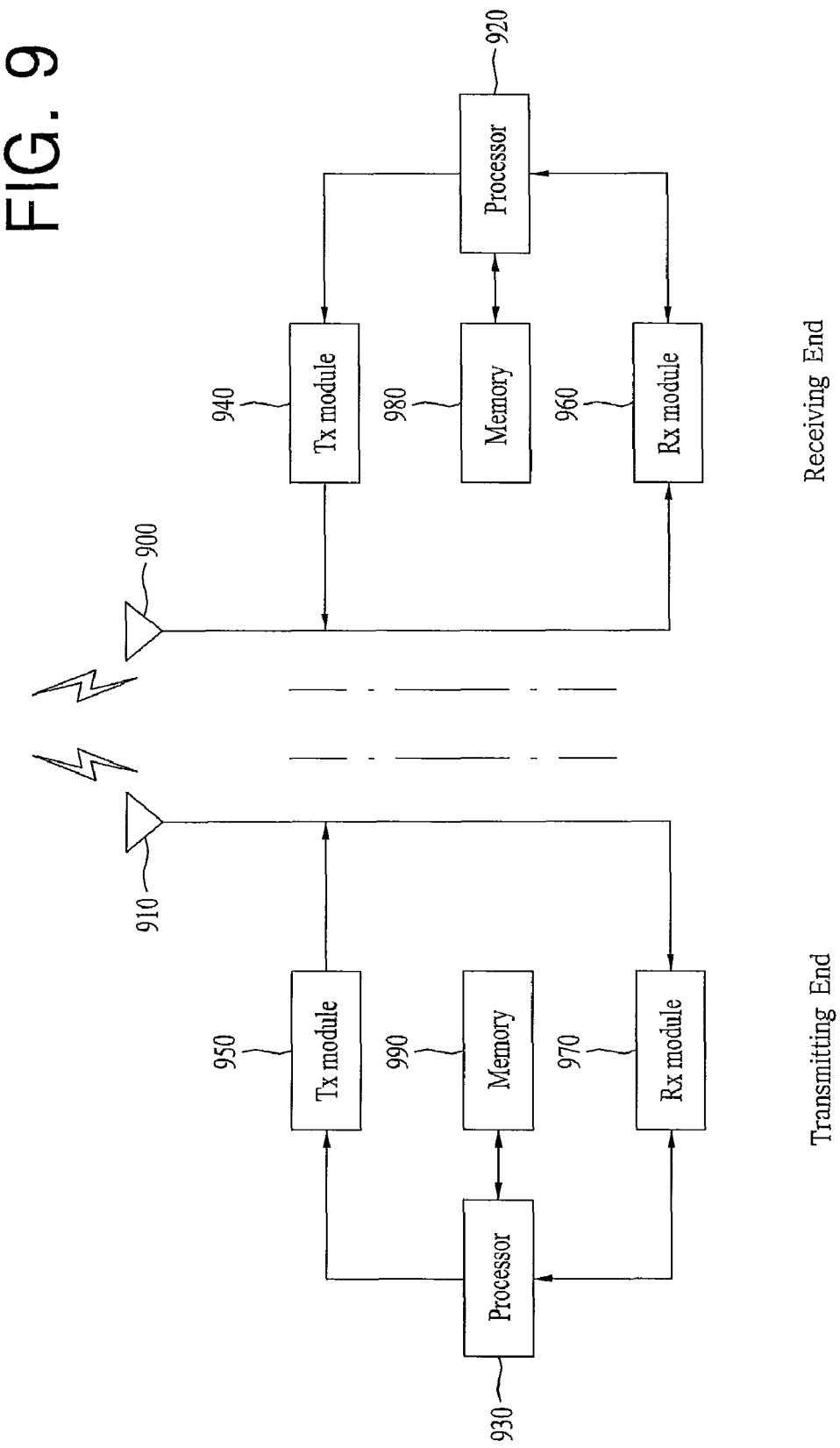
FIG. 9 is a block diagram illustrating an example of a transmitter and a receiver according to a further exemplary embodiment of the present invention.

FIG. 9 is a block diagram illustrating an example of the structures of a transmitter and a receiver according to a further exemplary embodiment of the present invention.

Referring to FIG. 9, left and right sides illustrate the structures of a transmitter and a receiver, respectively. The receiver and transmitter may include antennas 900 and 910, processors 920 and 930, transmission (Tx) modules 940 and 950, reception (Rx) modules 960 and 970, and memories 980 and 990. The respective constituent elements may perform functions corresponding thereto and a detailed description thereof will now be given.

The antennas 900 and 910 externally transmit signals generated from the Tx modules 940 and 950, respectively or externally receive radio signals to transmit the radio signals to the Rx modules 960 and 970, respectively. If a multiple-input multiple-output (MIMO) function is supported, each of the antennas 900 and 910 may have two or more antennas.

The processors 920 and 930 control the overall operation of the receiver and transmitter, respectively. The processors 920 and 930 may perform functions necessary to implement the above-described embodiments of the present invention, for example, a controller function, a MAC frame variable control function according to a service characteristic or radio environment, a handover function, and an authentication and encryption function.

In more detail, upon performing the steps related to the above-described zone switching methods, the processor of the MS may generate a ranging request message by determining contents to be included in a MAC message such as the ranging request message and may control the Tx module 950 so that the ranging request message can be transmitted to the BS at a proper time. The processor 930 may control the Rx module 970 to interpret the contents included in a MAC message such as an UL grant or ranging response message transmitted by the BS and may determine and perform an appropriate operation corresponding to the interpreted contents.

The processor of the BS may allocate an UL resource necessary for the MS by interpreting a MAC message or data transmitted by the MS and may perform scheduling by generating an UL grant for informing the MS of the allocated contents. In addition, the processor of the BS may allocate an ID such as an STID or FID necessary for the MS and may generate a MAC message including corresponding information to transmit the MAC message to the MS.

The Tx modules 940 and 950 are scheduled from the processors 920 and 930, respectively and perform coding and modulation with respect to externally transmitted data to transmit the coded and modulated data to the antennas 900 and 910, respectively.

The Rx modules 960 and 970 perform decoding and demodulation with respect to radio signals received through the antennas 900 and 910, respectively and transmit data restored to original form to the processors 920 and 930, respectively.

The memories 980 and 990 may store programs for processing and controlling the processors 920 and 930, respectively and temporarily store input/output data (in case of the MS, an UL grant allocated from the BS, system information, an STID, an FID, action time, etc.). Each of the memories 980 and 990 may include at least one type of storage medium among a flash memory, a hard disk, a micro multimedia card, a memory card (e.g., secure digital (SD) or extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Meanwhile, the BS performs, through at least one of the above-described modules, a controller function, orthogonal frequency division multiplex access (OFDMA) packet scheduling, time division duplex (TDD) packet scheduling, a channel multiplexing function, a MAC frame variable control function according to a service characteristic and radio environment, a fast traffic real-time control function, a handover function, an authentication and encryption function, a packet modulation/demodulation function for data transmission, a fast packet channel coding function, and a real-time modem control function, for performing the embodiments of the present invention. Alternatively, the BS may further include an additional means, module or portion for performing such functions.

Various embodiments have been described in the best mode for carrying out the invention.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. Claims that do not explicitly cite each other in the appended claims may be combined to configure an embodiment of the present invention or may be included as a new claim by amendment after the application is filed.

What is claimed:

1. A method, by a mobile station capable of communicating in accordance with a first protocol and a second protocol, of performing handover and zone switching from a serving base station configured to operate only in accordance with the first protocol to a target base station configured to operate in accordance with the first and the second protocol, the method comprising:
   receiving, in the mobile station and from the target base station, a ranging response message including a zone switching type/length/value (TLV) parameter used to perform zone switching from a mobile station support zone of the target base station corresponding to the first protocol (LZone) to a mobile station support zone of the target base station corresponding to the second protocol (MZone); and
   transmitting, from the mobile station to the target base station, a request for bandwidth for transmitting a ranging request to the MZone using the zone switching TLV parameter.

2. The method according to claim 1, further comprising:
   receiving from the MZone an uplink grant including allocation information for transmitting the ranging request message; and
   transmitting the ranging request message to the MZone in accordance with the allocation information.

3. The method according to claim 2, wherein the zone switching TLV parameter includes at least one of a station identifier (STID) for identifying the mobile station, a flow identifier (FID), and a zone switching action time field indicating a time point at which the zone switching is to be performed.

4. The method according to claim 3,
   wherein the step of transmitting a request for bandwidth includes transmitting a bandwidth request message using the STID, and
   wherein the step of transmitting a request for bandwidth is performed at a time point indicated by the zone switching action time field.

5. The method according to claim 4,
   wherein the zone switching TLV parameter further includes an uplink grant for transmitting the bandwidth request message, and
   wherein the step of transmitting a request for bandwidth is performed using an uplink resource indicated by the uplink grant.

6. The method according to claim 4,
   wherein the step of transmitting a request for bandwidth further includes:
     transmitting, to the MZone, a bandwidth request code; and
     receiving from the MZone an uplink grant for transmitting the bandwidth request message, and
   wherein the step of transmitting a request for bandwidth is performed using an uplink resource indicated by the uplink grant.

7. The method according to claim 3 wherein the step of transmitting a request for bandwidth includes transmitting to the MZone a bandwidth request message and a bandwidth request code.

8. The method according to claim 1, further comprising:
transmitting to the LZone a ranging request message including a zone switching request field.

9. The method according to claim 8, wherein the zone switching request field is a ranging purpose indicator field in which a value of bit 4 is set to '1'.

10. The method according to claim 1, wherein the ranging request message includes at least one of capability information and security information provided by the mobile station.

11. The method according to claim 10, wherein the capability information includes at least one of multi-carrier information, femto capability, relay capability, physical capability, and media independent handover (MIH) capability.

12. The method according to claim 10, further comprising:
receiving a ranging response message from the MZone as a response to the ranging request message,
wherein the ranging response message includes at least one of capability information provided by the target base station according to capability negotiation and security parameters.

13. A method, by a target base station capable of communicating in accordance with a first protocol and a second protocol, of performing handover and zone switching from a serving base station, configured to operate only in accordance with the first protocol, of a mobile station configured to operate in accordance with the first and the second protocol, the method comprising:
transmitting, from the target base station to the mobile station, a ranging response message including a zone switching type/length/value (TLV) parameter used to perform zone switching from a mobile station support zone of the target base station corresponding to the first protocol (LZone) to a mobile station support zone of the target base station corresponding to the second protocol (MZone); and
receiving, from the mobile station by the target base station, a request for bandwidth for transmitting a ranging request to the MZone using the zone switching TLV parameter.

14. The method according to claim 13, further comprising:
transmitting, from the target base station to the mobile station, an uplink grant for transmitting the ranging request message by the mobile station to the target base station through the MZone; and
receiving, in the target base station and from the mobile station, the ranging request message through an uplink resource indicated by the uplink grant.

15. The method according to claim 14, wherein the zone switching TLV parameter includes at least one of a station identifier (SID) for identifying the mobile station in the MZone, a flow identifier (FID), and a zone switching action time field indicating a time point at which the zone switching is to be performed.

16. The method according to claim 15,
wherein the step of receiving a request for bandwidth includes receiving, from the mobile station, a bandwidth request message including a request to transmit the ranging request message through the MZone, and
wherein the bandwidth request message is received at time corresponding to a time point indicated by the zone change action time field.

17. The method according to claim 16,
wherein the zone switching TLV parameter further includes an uplink grant for transmitting the bandwidth request message, and
wherein the bandwidth request message is received through an uplink resource indicated by the uplink grant.

18. A mobile station configured to communicate in accordance with a first protocol and a second protocol, and to perform handover and zone switching from a serving base station configured to operate only in accordance with the first protocol to a target base station configured to operate in accordance with the first and the second protocol, the mobile station comprising:
a reception module;
a transmission module; and
a processor operatively connected to the transmission and reception modules, wherein the processor is configured to receive, from the target base station, a ranging response message including a zone switching type/length/value (TLV) parameter used to perform zone switching from a mobile station support zone of the target base station corresponding to the first protocol (LZone) to a mobile station support zone of the target base station corresponding to the second protocol (MZone); and
transmit, to the target base station, a bandwidth request message including a request for bandwidth for transmitting a ranging request to the MZone using the zone switching TLV parameter.

19. The mobile station according to claim 18, wherein the zone switching TLV parameter includes at least one of a station identifier (STID) for identifying the mobile station, a flow identifier (FID), and a zone switching action time field indicating a time point at which the zone switching is to be performed.

20. The mobile station according to claim 19, wherein the processor is configured to transmit the bandwidth request message to the MZone at a time point indicated by the zone switching action time field.

21. The mobile station according to claim 20, wherein the processor is configured to transmit to the LZone a ranging request message including a predetermined field, in which a bit value for a zone switching request is set.

22. The mobile station according to claim 19,
wherein the zone switching TLV parameter further includes an uplink grant for transmitting the bandwidth request message, and
wherein the processor is configured to transmit the bandwidth request message using an uplink resource indicated by the uplink grant.

23. The mobile station according to claim 19, wherein the processor is configured to transmit a bandwidth request code as a request for transmitting the bandwidth request message to the MZone.

* * * * *